(12) United States Patent
Spilo

(10) Patent No.: US 6,601,091 B1
(45) Date of Patent: Jul. 29, 2003

(54) METHOD FOR IMPROVING THE PERCEIVED PERFORMANCE OF A COMPUTER SYSTEM

(75) Inventor: Michael L. Spilo, New York, NY (US)

(73) Assignee: Networks Associates Technology, Inc., Santa Clara, CA (US)

(*) Notice: Subject to any disclaimer, the term of this patent is extended or adjusted under 35 U.S.C. 154(b) by 0 days.

(21) Appl. No.: 08/623,279

(22) Filed: Mar. 28, 1996

(51) Int. Cl.⁷ .............. G06F 15/00; G06F 17/30
(52) U.S. Cl. ............... 709/217; 709/227; 709/229
(58) Field of Search ............... 395/610, 762, 395/672, 200.09, 200.12, 464, 200.47, 200.48, 200.49; 707/3, 501, 10, 109.1, 200, 201, 203, 204; 709/217, 218, 219, 227, 228, 229

(56) References Cited

U.S. PATENT DOCUMENTS

| | | | | |
|---|---|---|---|---|
| 4,891,785 A | * | 1/1990 | Donohoo | 395/200.01 |
| 5,019,963 A | * | 5/1991 | Alderson et al. | 395/617 |
| 5,146,578 A | * | 9/1992 | Zangenehpour | 395/464 |
| 5,305,389 A | * | 4/1994 | Palmer | 395/464 |
| 5,313,646 A | * | 5/1994 | Hendricks et al. | 395/612 |
| 5,361,391 A | * | 11/1994 | Westberg | 395/464 |
| 5,381,555 A | * | 1/1995 | Brauns et al. | 395/800 |
| 5,388,260 A | * | 2/1995 | Monahan et al. | 395/401 |
| 5,465,358 A | * | 11/1995 | Blades et al. | 395/339 |
| 5,483,650 A | * | 1/1996 | Pedersen et al. | 395/602 |
| 5,491,820 A | * | 2/1996 | Belove | 707/3 |

OTHER PUBLICATIONS

Vetter, Ronald J. "Mosaic and the World–Wide Web", Computer Magazine v20 i10 Oct. 1994 pp. 49–57. CD. IEEE/IEE Pub. Ondisc.*

"SlipKnot News and Announcements", n. pag. Online. Internet. Aug. 8, 1997. Available http://www.users.interport.net/~pbrooks/.*

"SlipKnot's New Get All Links" Retrieval Feature, n. pag. Online. Internet. Aug. 8, 1997. Available http://www.users-.interport.net/~pbrooks/.*

SlipKnot's FAQ, n. pag. Online. Internet. Aug. 8, 1997. Available http://www.users.interport.net/~pbrooks/, Oct. 1995.*

* cited by examiner

Primary Examiner—Dung C. Dinh
(74) Attorney, Agent, or Firm—Silicon Valley IP Group, LLC; Kevin J. Zilka; Christopher J. Hamaty

(57) ABSTRACT

A method for improving the performance and responsiveness of a computer program is presented. The system consists of a read-ahead mechanism that scans current data-sets and reads data-sets referenced within the current data-set prior to any actual request or access to the data set by the system. The determination of which data sets to access is made based upon a prioritization computed either through user defined settings or through heuristic observation of the system's behavior. The present invention has particular value in connection with Internet communications and access to remote data.

5 Claims, 6 Drawing Sheets

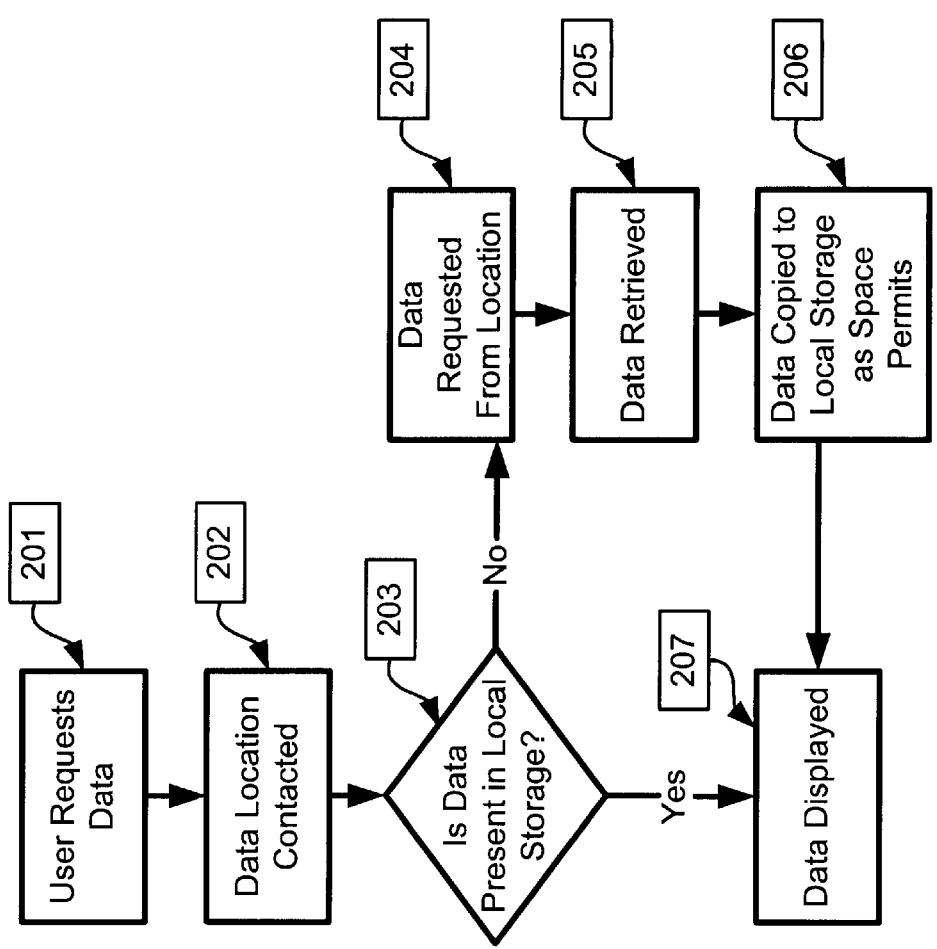
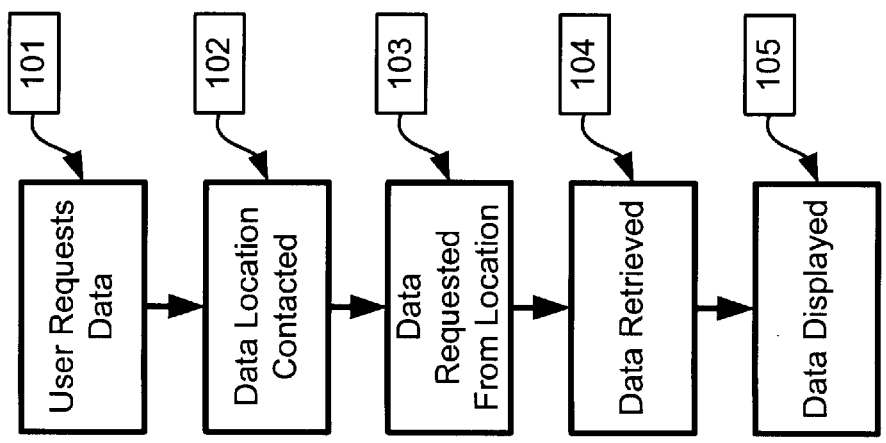

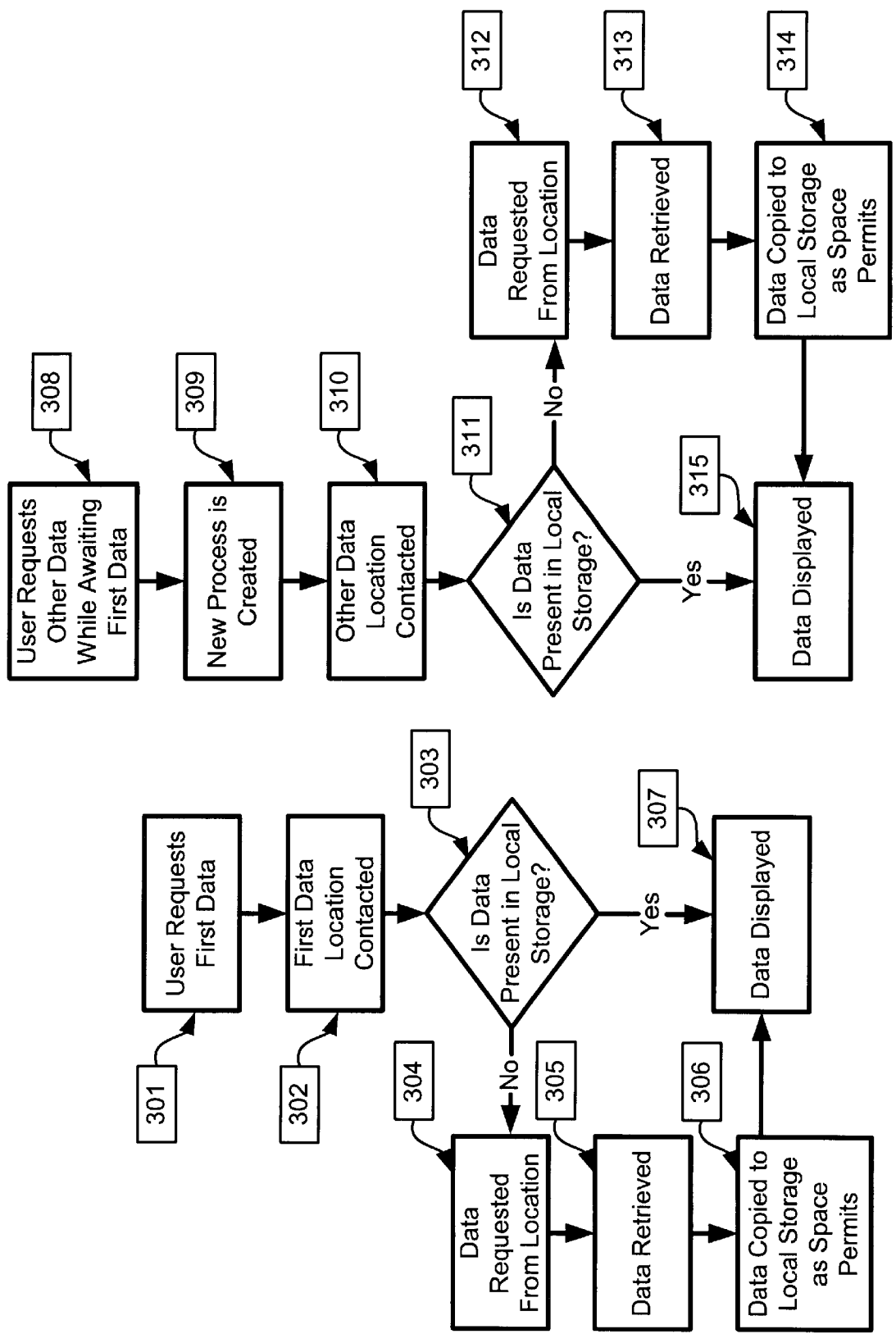
Figure 3: Traditional Multi-Session Internet Browser with Cache

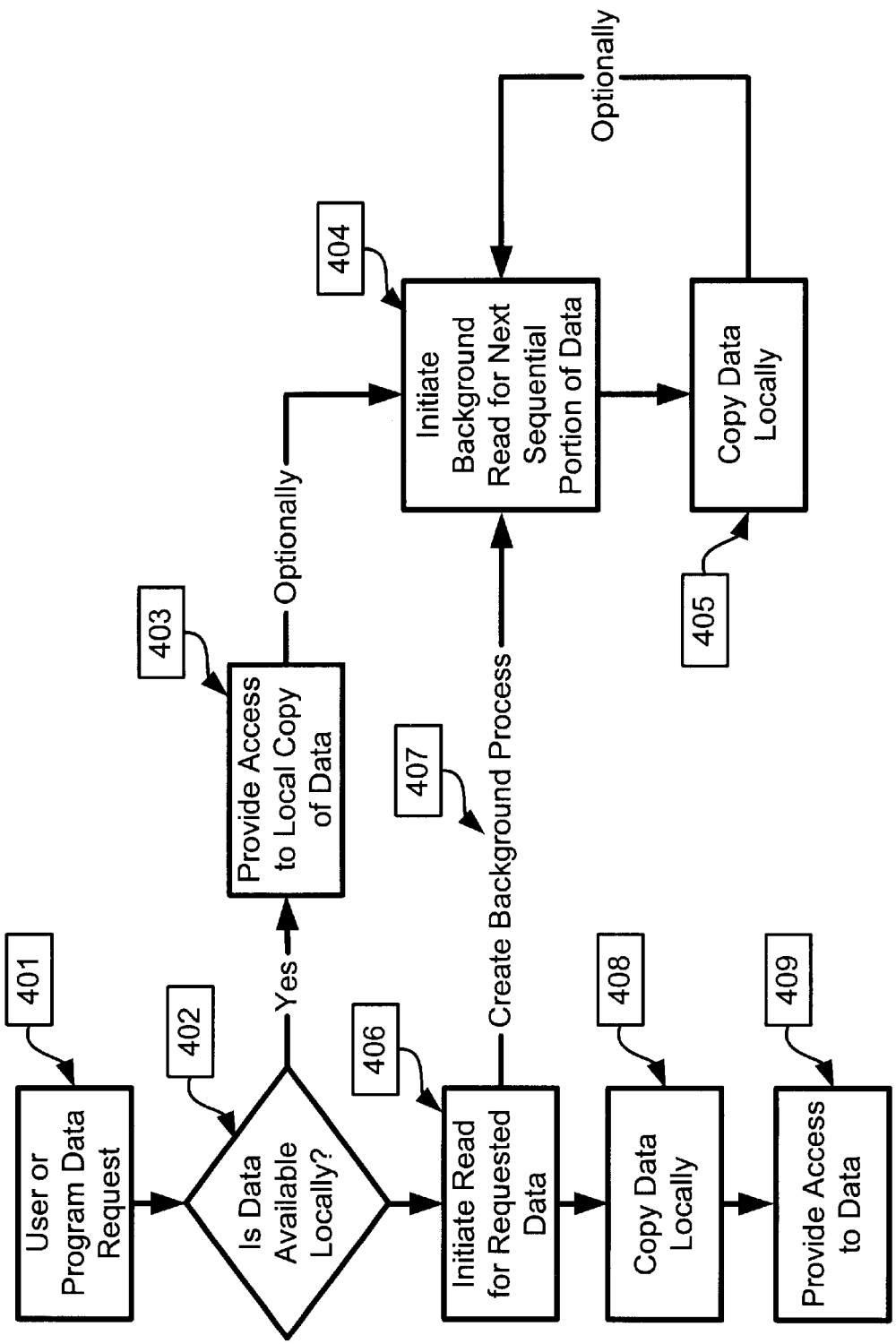
Figure 4: Traditional Read-Ahead Cache

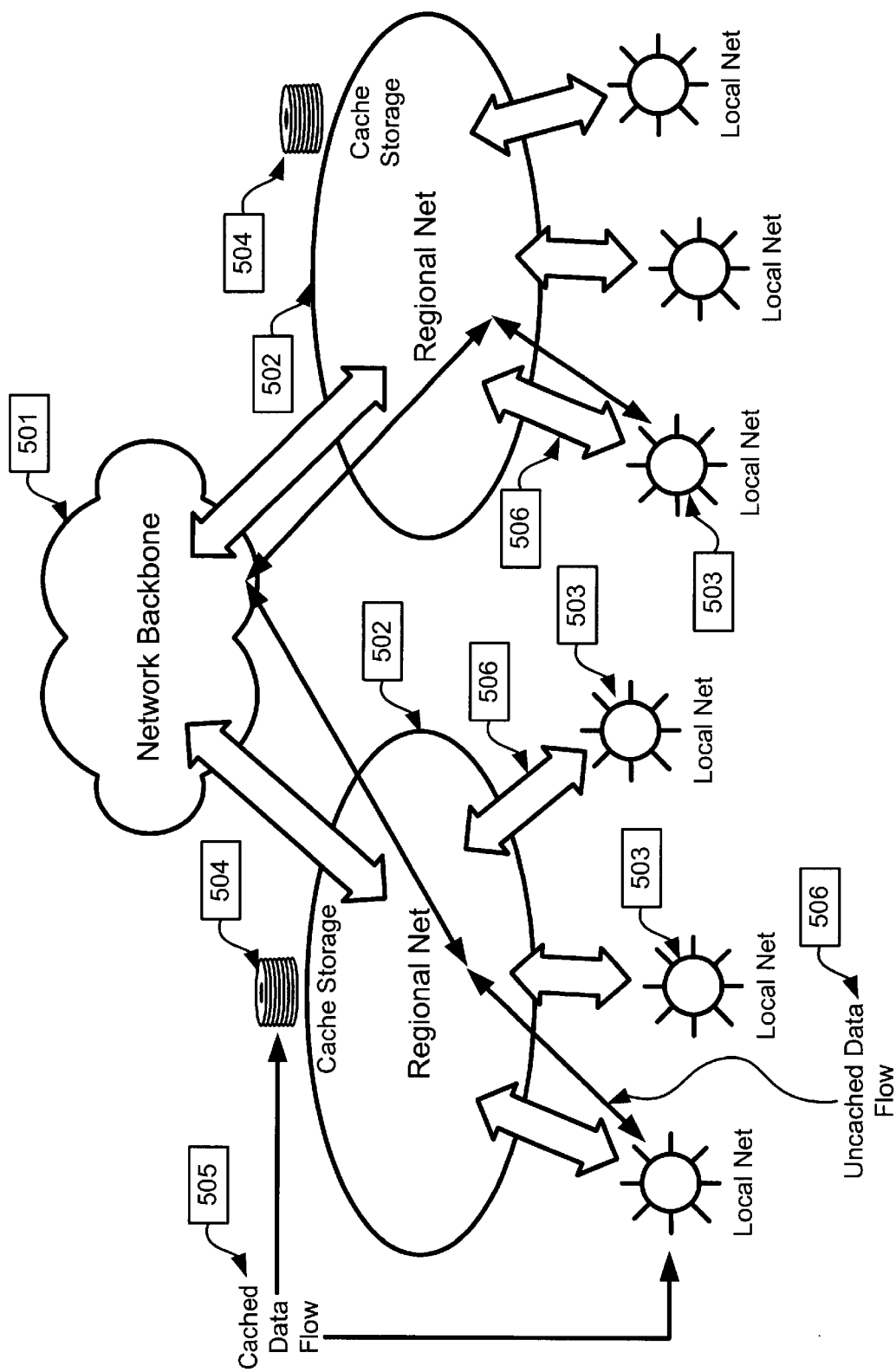
Figure 5: Wide-Area Network Cache (Harvest)

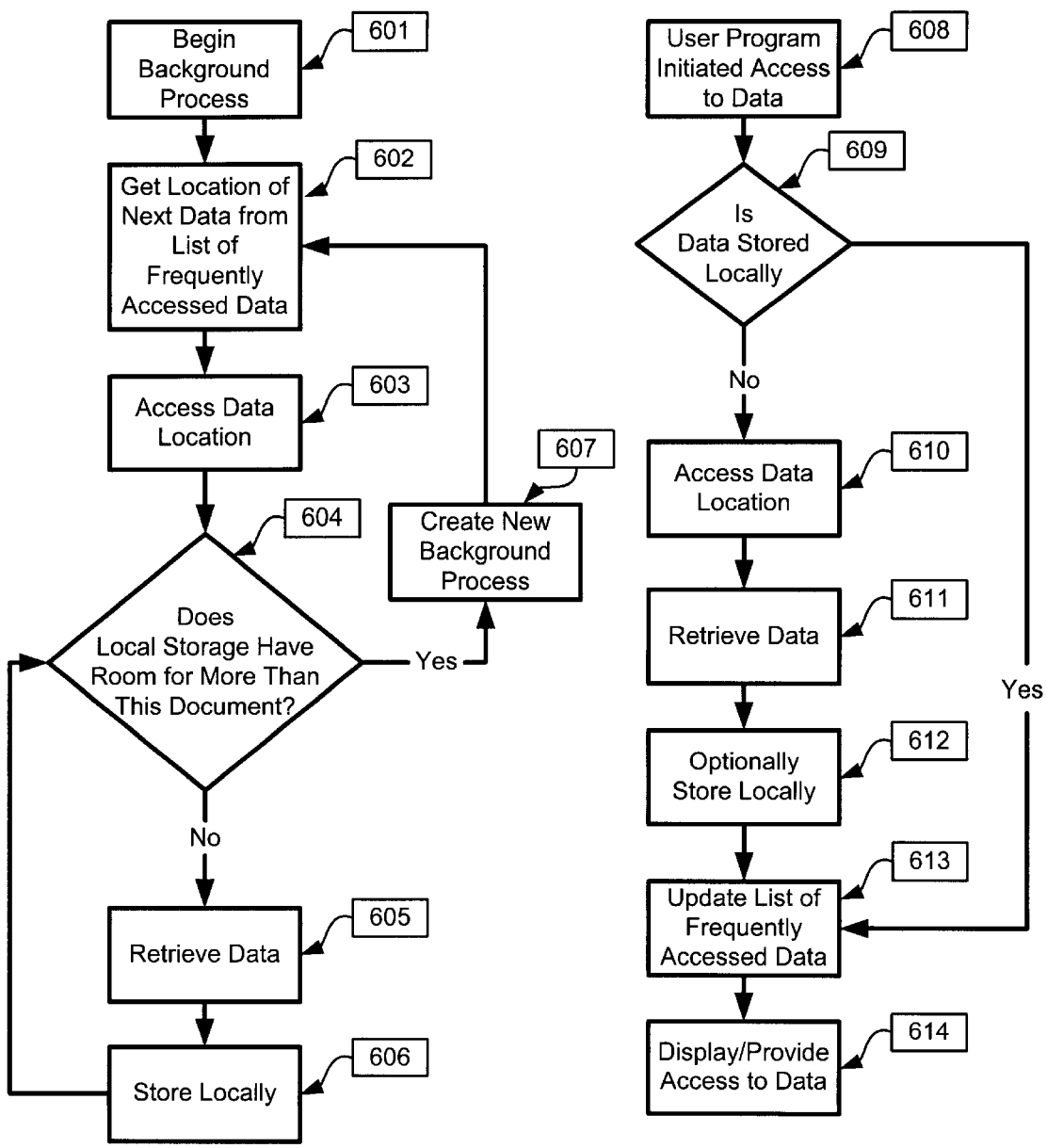

METHOD FOR IMPROVING THE PERCEIVED PERFORMANCE OF A COMPUTER SYSTEM

BACKGROUND OF THE INVENTION

The Internet is a large scale wide-area network connecting a rapidly growing number of sites. The Internet consists of a communications protocol and addressing scheme allowing any two computers on the Internet to communicate with each other. This backbone is implemented by several layers allowing specific types of communication between a wide variety of systems. File Transfer Protocol (ftp) capable Internet sites respond to a particular type of communications request by exposing a list of files and directories. Hyper Text Transfer Protocol (http) capable Internet sites provide access to a specific document which contains text formatted with predefined formatting commands which lay out the format of the text and includes pointers to other http documents or graphic images.

Several other protocols exists, and others may develop as the Internet grows. The present invention is directed to ftp and http sites, but is intended to handle other protocols as well. The term "World Wide Web", or simply "Web", refers collectively to the collection of Internet sites responding to these protocols, and specifically to the collection of http-compatible sites.

In order to access the Internet, a user must have access to a direct or indirect connection to the Internet hardware backbone. The backbone is provided by a number of large Internet sites at private service provider companies, universities and government institutions. These sites accept data destined for some specific Internet address and route the data packet to the destination in-accordance with a predefined routing protocol.

Smaller Internet sites can be part of the routing mechanism, thus providing a hierarchical network of continuously decreasing bandwidth. At the bottom end, individual end-users access a local site through a modem or other connection. The individual end-user's computer is then considered to have its own Internet address and data can be "routed" to the end-user's computer. Small networks can also be connected to the Internet through several methods, allowing all users on a small network to access the Internet.

Computers connected to the Internet can be "Servers" which generally respond to ftp or http requests, and/or "Clients" or "Browsers" which primarily let users access information provided by a Server. Such Browser software requests a site address from the user, and accesses the site, presenting the user with whatever information is made available by the Server at the site the user selected.

FIG. 1 shows the general operation of an Internet Browser. In 101 the user requests access to a particular site (either directly or by defining a "home" site that is always displayed first). In 102 the Browser looks up the Internet protocol (ip) address of the requested data and contacts the remote sites. In 103 the data is requested. It is retrieved at 104 and presented to the user at 105.

For ease of use, users are not required to enter the actual numeric Internet address (or ip address) of the site which they are interested in contacting. Instead, the Internet contains, at various service provider locations, Domain Name Servers (DNSs). These DNSs contain databases of Internet addresses and names of the sites that provide the resource associated with the name. These names stored in the DNS databases conform to a specification called the Uniform Resource Location (URL) specification. Thus, the user need only know the URL name of the site they wish to access, and the Browser software will search a local DNS for the actual address of the site so named.

A known method (see Mosaic Web Browser or Netscape version 1.0) includes the ability for caching documents that have been accessed previously, whether in the same or a previous session. (The CompuServe Interface Manager for Windows, WinCIM, also provides a cache of certain bitmaps and documents). This method allows subsequent accesses to the same document, and may, prior to retrieving a document, check the local cache to see if the document exists locally and if it has been modified since it was copied locally. FIG. 2 diagrams the operation of this method. In 201 the user indicates which site to contact, as usual. In 202 the site is contacted; the Browser determines whether the data has been modified via a last modified time stamp, checksum or other procedure. In 203 the Browser determines whether the modified version of the data is available locally. If not, the data is requested (204), retrieved (205) and copied into the local cache (206). The appropriate data, either the local or retrieved copy, is then displayed (207).

This is a useful methodology and can be implemented together with the present invention. This technique, however, only provides faster access to documents that have been accessed previously and, have not subsequently changed. Thus, this method is unable to provide an improvement in accessing data that changes frequently. Also, this technique, if it is applied across multiple sessions, tends to consume large quantities of local storage for the document cache. In order to provide any improvement, the local storage for cross-session access must be sufficient to provide a meaningful portion of what the user may see, and thus the method is not generally practical.

In another prior art method (see Dr. Dobb's Journal April 1996, The Harvest Object Cache and references therein) the problem of speeding up the overall response time of the Internet and reducing the load on the Internet is tackled. This is accomplished via distributed caching at the local or regional network level.

FIG. 5 is a simplified diagram of this system. Local networks 503 are connected to a regional network 502 which in turn is connected to a wide area network backbone 501. A typical data request (506) is initiated at a local workstation, and flows through a local regional network to the network backbone and then to another regional network and finally to another local network. The response would follow the reverse path back to the user.

In this method, cache storage 504 is added at various points in the network, and frequently-accessed documents are kept in duplicate in the cache storage and accessed through data path 505. The response to a data request is thus quicker when the requested data can be retrieved from the cache 504, as the request need not be passed down to the appropriate local network and back up again.

This is a useful and laudable goal. However, the end-user is interested in the apparent performance of the end-user's own workstation, and in the time spent actually connected to the Internet. So, the actual response time of the Internet is less material if it seems to the user that the Internet response was instantaneous. In other words, the time it took the user's workstation to access the information is immaterial provided it appears as soon as it is requested by the user. Furthermore, since the user is charged for connect time rather than message units, the user is concerned with the overall time spent logged on to the Internet rather than the amount of time spent accessing particular objects.

This prior art caching methodology does not satisfy three needs: First, it is of little assistance in the accessing of documents that change frequently (for instance, newspaper front pages) or to documents that are accessed infrequently or have never been accessed previously, as such documents would not be in a cache. Second, this method can be difficult to deploy, requiring some cooperation between the regional networks, and increases the cost of providing network services. In addition, this method does not improve access speed if a low bandwidth bottleneck exists between the user's workstation and the cache which contains the requested data.

Because of the varying bandwidths of the various sites on the Internet and because of the indefinite nature of the connection between servers and browsers, there can be a varying degree of lag time between an access request and a response. The combination of several such lags can result m insignificant delay in response to a user's request.

A third prior art method (see Microsoft Internet Browser for Windows 95) allows the user to take manual advantage of a slow-to-respond server by creating a separate, simultaneous network access. FIG. 3 diagrams this multi-session Internet access. The user initiates a first contact with a first site at 301, and the Browser behaves at 302–307 as described above for a normal cached network Browser. In this method, the user can, upon determining that response from the first contact is slow, initiate a second, independent network Browser session at 308, contacting some other site or data set. This causes the Browser to effectively clone the first session at 309 and provide a second session at 310–315.

This method does not provide any increased performance or perceived performance within any one session. This method also requires that the user manually select the next site to contact, and so does not take advantage of the slow response time of the user. This method also does not provide any quicker response to subsequent accesses to a single site, and requires that the user manage multiple sites, an often confusing task.

A fourth prior art method is demonstrated in the read-ahead caching functionality of the SmartDrive disk cache found in the MS-DOS operating system and in similar disk caching schemes such as Symantec Corp's NCACHE and Microsoft's VFAT found in Windows 95. This prior art, diagramed in FIG. 4, accesses a data set sequentially, taking advantage of the delay in retrieving the next sequential part of the data. Thus, the user or user program can begin to process the first item read in while the system reads the next part of the data. A data request at 401 is checked at 402 to determine whether the data has been cached. If so, it is accessed at 403. If it is not available a read request is initiated. In 406 the first part of the data is accessed. In 407 a background procedure is created to access more of the data. In 404 the next sequential data item (either physically on the disk in SmartDrive system or linearly in the dataset in Microsoft's VFAT) is read in the background. The read data is then copied locally at 405.

This prior art method is not appropriate for an Internet Browser, because the amount of time required to display or process a data item retrieved is very small in comparison to the amount of time required to actually retrieve the data item. Thus, accessing the next sequential pat of the same data set in the background provides no improvement. Furthermore, the data is usually requested all at once and so there is no point in which a request for a data item is not real-time. Finally, to a certain extent this kind of traditional read-ahead is automatically a part of a traditional browser implementation, since the data is usually displayed by a process separate from the one that is performing the I/O and so a de facto read-ahead on the entire data set is performed.

It is therefore a primary objective of the present invention to reduce the perceived delay in response to a user's request for remote information.

It is a further objective of the present invention to reduce the perceived delay in response without requiring dedicated local storage for inter-session caching.

It is a further objective of the present invention to reduce the perceived delay in response even for documents that are being accessed by the workstation for the first time, or have changed since they were accessed last.

It is a further objective of the present invention to allow the user to take advantage of the delayed response time of some sites, without having to manually manage accesses to multiple sites.

BRIEF SUMMARY OF THE INVENTION

The present invention is an Internet Browser, which can be implemented either as an adjunct to existing Browsers or as a stand-alone, fully functional Browser. The present invention functions by multi-threading or directing requests to multiple sites and by accessing all documents from a given site as soon as their address is known. The present invention may also include user determined, both heuristically through monitoring user preferences and through simple settings, preferences as to which addresses receive access priority.

The present invention monitors each HTML page or other document currently being accessed, and analyzes the references within the document. It immediately and concurrently accesses the secondary documents referenced. Thus, a document referencing several other documents is read, causing the immediate reference of the secondary documents identified therein and the commencement of their transmission before or while the original document is being presented to the user. While the user examines the original document, the other documents will have already been retrieved, or will be in the process of being retrieved, to the user's system, providing instant access as soon as the user selects the appropriate document. Such a procedure takes advantage both of the differing response time from different sites, and of "down time" caused by the user's relatively slow ability to assimilate the information as its presented.

BRIEF DESCRIPTION OF THE DRAWINGS

A fuller understanding of the present invention will be accomplished upon consideration of the following detailed description of a preferred, but nonetheless illustrative embodiment thereof, when reviewed in association with the annexed drawings, wherein:

FIG. 1 is a flow diagram of a known Internet Browser;

FIG. 2 is a flow diagram of a known Internet Browser having a cache;

FIG. 3 is a flow diagram of a known multi-session Internet Browser;

FIG. 4 is a flow diagram of a known read-ahead cache;

FIG. 5 is a depiction of a known network cache;

FIG. 6 is a flow diagram of the present invention utilizing a pre-defined read-ahead sequence.

DETAILED DESCRIPTION OF THE INVENTION

Figure 7:
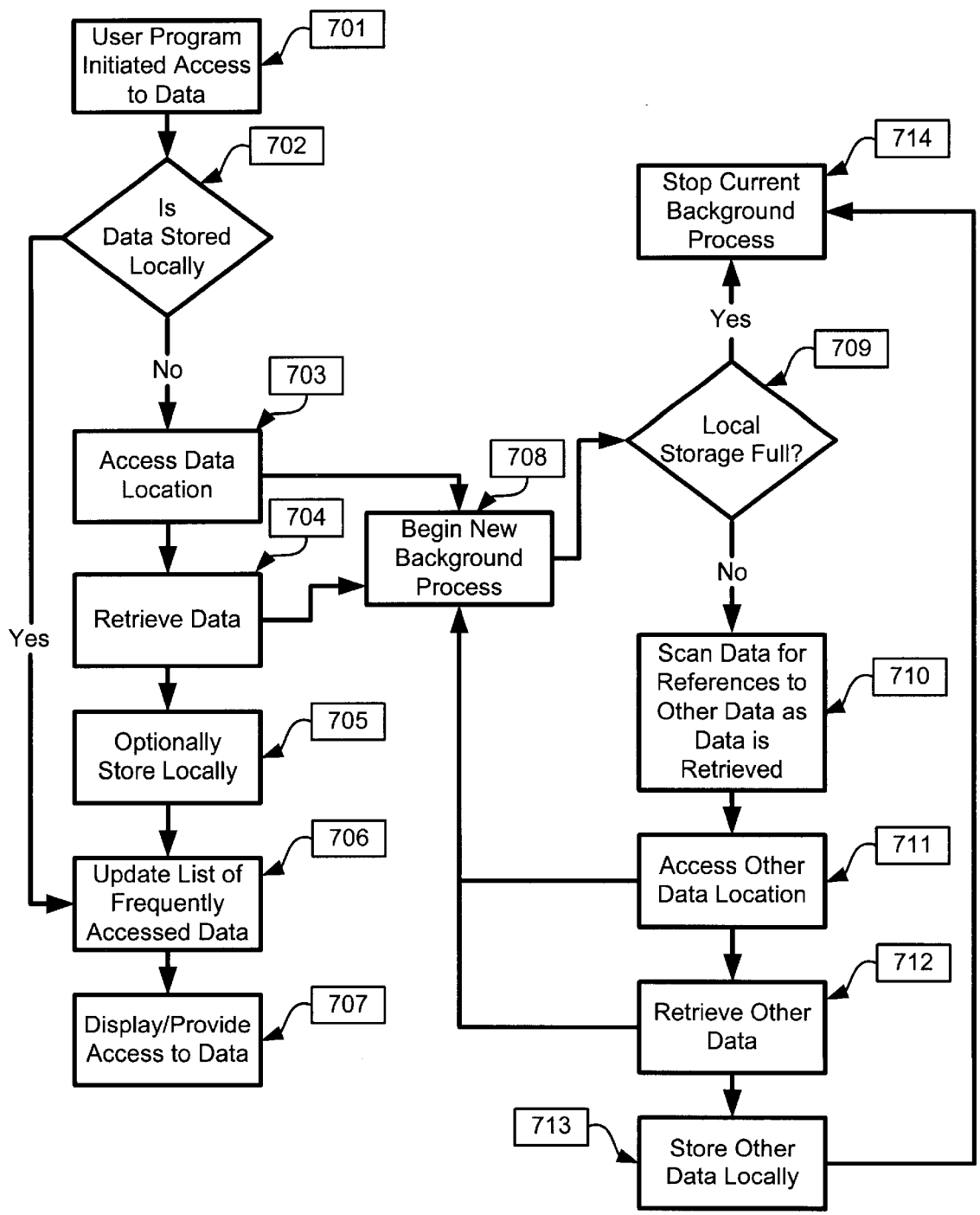
FIG. 7 is a flow diagram of the present invention incorporating a variable read-ahead sequence.

In a preferred embodiment, the present invention interacts with an Internet Browser that is capable of having multiple active sessions. The present invention assembles a list of user-defined key words for each type of document (e.g., a list of directory names of interest for ftp sites) along with optional priorities associated with each. The present invention also assembles and maintains a list of sites accessed by the user, along with information concerning the frequency at which the sites were accessed and in what order. (e.g., if a user frequently accesses the Ziff Davis Network main page and is most likely to move next to PC-Magazine, the present invention would remember that sequence.) The processes of the present invention are preferably performed as background processes, wherein they can give precedence to, or may yield to, other system needs on an as needed or required basis. As a background process the retrieval processes of the invention further may be performed on a simultaneous basis, whereby multiple data sets may be retrieved interspaced with each other or with other system activities, thus providing for rapid retrieval and availability for subsequent access to the data sets by other system activities.

These lists are maintained to allow the present invention to determine which sites to contact and according to what priority during an Internet session. Additional methods, such as interaction with, a predefined "bookmark" list, such as found in the Netscape Navigator, are contemplated and may be added in other implementations. As soon as it is activated, the present invention begins retrieving data from the list of frequently accessed sites. This data is held in local storage pending a request from the user.

With reference to FIG. 6, the present invention, upon initiation of a communications session, commences, as a background process 601, the contacts with a predefined list of sites, downloading multiple documents simultaneously. The list of sites may be the result of data acquired through prior communications sessions, or as a result of data manually or otherwise supplied by the user, or an applications program, or a combination of the foregoing. The data list is accessed on a sequential basis at 602, with the next data location being accessed at 603. As part of the access process, the size of the document is obtained. This size data is used at 604 to determine whether, when the document is retrieved and stored locally, there would remain additional space for further retrieved documents. The storage may be on hard or floppy disk, ram, etc., as known in the art. If this determination indicates that further storage space is available, a next background retrieval process is commenced at 607, whereby the next location is identified, accessed and available space determined. This process continues, whereby the documents are accessed on a continuing basis, until the determination at 604 indicates that no further documents will be able to be stored. At that point, the process branches to 605, whereby the accessed data is retrieved and placed into local storage at 606. The system then enters a waiting phase, awaiting a new decision at 604 that local space has become available, at which time the document retrieval process through a new process 607 is recommenced. Such local space may become available by the invention deleting one or more stored documents after a set period of time, after a period of non-use, or otherwise. Such parameters may be specified and set by the user.

FIG. 6 also depicts the methodology by which a listing utilized for access is generated. This may commence at 608, where a local request, such as generated through a user program, seeks particular data. A first determination is made at 609 as to whether such data appears locally, perhaps as a result of a prior retrieval process. If the data is not stored locally, a remote access is initiated at 610. The data is retrieved at 611 and if desired, the data is stored locally at 612. As a result of the access, the listing of accessed sites is then updated at 613 to reflect the occasion of the request for a new set of data. The actual update process may be subject to various parameters, either system or user created. Thus, the "update" may or may not actually result in a physical update, and may further include a reevaluation or adjustment of the hierarchy of requests to accommodate the newest entry. The requested data is then displayed or made available for use at 614.

If a determination at 609 indicates that the data is already stored locally, the remote access portion of the methodology may obviously be avoided. The system thus immediately allows at 613 for an update of the data list. Such update might occur, for example, to reflect the fact that the accessed data is, in fact, now local and need not be further retrieved, or to change the subsequent priority of access for such data to reflect more current usage thereof It is to be further appreciated that the data list, which may be updated at 613 and which is accessed at 602, is intended to be able to be modified by the user, either by the introduction of additional sites, the deletion of a previously listed site, or by adjustment of the priority or hierarchy of the list. This provides a maxim degree of flexibility to the retrieval process, and allows the user to accommodate limited local storage capacity for the retrieved materials.

FIG. 7 presents an alternative embodiment for the present invention in which the accessing of documents becomes a multiple-threading process, whereby a broader range of documents may be accessed. It incorporates user requests into the dynamically operating retrieval process.

The methodology depicted in FIG. 7 commences with a user program-initiated access to particular data at 701. Once again, a determination is made as to whether the data is available in local storage, or needs to be accessed from a remote source. If the data must be accessed, the access process starts at 703, followed by the retrieval of the data at 704, local storage, if required or desired at 705, followed by an optional list update session at 706. Once again, the optional update may be subject to system and userdefined control parameters, such as a change in priority based upon extent or time of use. With data access and retrieval in process, a subsequent background retrieval process commences at 708. A determination is made whether a further document can be accessed by consideration of local storage at 709. If there is no additional room, the process is halted at 714. If local storage facilities remain available, the new background process now scans, at 710, any retrieved data to identify additional reference documents, such as by inspecting for embedded URL addresses, and commences the contact procedure at 711 through the generation of a further background process 708 concurrently with data retrieval at 712 with respect to the first of such identified sites.. The retrieval of this "secondary" data itself may result in the identification of further sites at 710, generating further background processes 708, whereby, as long as local space is available at 709, the access continues. It may be thus appreciated that a multiple-threading process, bringing into local storage reference data generated through multiple levels of access, is produced.

The generation of a new background process at 708 may be programmed or controlled in accordance with user and system preferences. For example, a determination as to whether an additional identified site is to be contacted may be based upon a listing of key words appearing in the document in which the further reference is made. The determination may further or alternatively include an analysis of the user's past preferences, and may include, for example, identification of certain sites which the user has previously indicated are not of interest. Further, since with present technology it may not be generally useful to attempt to access multiple documents from the same site, the background process can further include a prioritization whereby access to multiple sites is given preference to multiple documents at a single site. The system may further allow the compression of multiple requests to a single site into a single request, particularly where requests may be satisfied at intermediate caching software between the user and the actual server sought to be accessed.

It is further to be recognized that the access of additional sites, such as depicted in steps 607 and 711, can be subject to limitations. The number of sites may be subject to a specific numerical limitation, a maximum number of documents, a maximum amount of storage space required, maximum throughput or any other convenience measure which could be used to prevent an overload of local processing or storage capacity.

I claim:

1. A method for increasing the performance of a data-retrieval program in a computer system, comprising:

generating a list of frequently-accessed data sets on the Internet, wherein the list is generated based on prior communications sessions;

commencing as a user-programmable background activity for the computer system access and retrieval of the frequently-accessed data sets of the list via the Internet;

conditionally storing the retrieved data sets in local storage based on an amount of available local storage in the computer system and a size of the frequently-accessed data sets of the list via the Internet;

receiving a request for one or more of the data sets from a user;

determining whether the requested data sets are available in the local storage;

commencing the access and retrieval of the requested data sets via the Internet in response to the request, if it is determined that the requested data sets are not available in the local storage;

providing access to a local copy of the requested data sets in the local storage in response to the request, if it is determined that the requested data sets are available in the local storage; and updating the list of frequently-accessed data sets to reflect the access and retrieval of the requested data sets via the Internet.

2. The method of claim 1, wherein the data-retrieval program includes a network browser.

3. The method of claim 1, wherein a plurality of the background activities is commenced simultaneously.

4. The method of claim 1, wherein the data sets include sites on the Internet.

5. A method for increasing the performance of a data-retrieval program in a computer system, comprising:

generating a list of frequently-accessed data sets including sites on the Internet, the list being generated manually by a user by adding and deleting sites found on the Internet, the list being further generated based on interaction with a bookmark list;

commencing as a background activity for the computer system access and retrieval of the frequently-accessed data sets of the list via the Internet, wherein the frequently-accessed data sets of the list are accessed and retrieved in a sequential manner programmed by the user;

storing the retrieved data sets in local storage;

receiving a request for one or more of the data sets from a user;

determining whether the requested data sets are available in the local storage;

commencing the access and retrieval of the requested data sets via the Internet in response to the request, if it is determined that the requested data sets are not available in the local storage; and providing access to a local copy of the requested data sets in the local storage in response to the request, if it is determined that the requested data sets are available in the local storage.

* * * * *